US012809356B2

(12) United States Patent
He et al.

(10) Patent No.: US 12,809,356 B2
(45) Date of Patent: Nov. 24, 2026

(54) ROOT CAUSE ANALYSIS FRAMEWORK IN INDUSTRIAL PROCESS ANALYTICS

(71) Applicant: Rockwell Automation Technologies, Inc., Mayfield Heights, OH (US)

(72) Inventors: Meiling He, Shorewood, WI (US); Dennis J. Luo, Germantown, WI (US); Justice Darko, Charlotte, NC (US); Ishit Patni, Pune (IN); Ankan Chowdhury, Pimpri-Chinchwad (IN); Tasha Markovich, North Royalton, OH (US); Fatime Ly Seymour, Charlotte, NC (US); Francisco P. Maturana, Lyndhurst, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 460 days.

(21) Appl. No.: 18/503,898

(22) Filed: Nov. 7, 2023

(65) Prior Publication Data

US 2025/0147488 A1 May 8, 2025

(51) Int. Cl.
*G05B 19/418* (2006.01)

(52) U.S. Cl.
CPC .................... *G05B 19/4184* (2013.01); *G05B 2219/32128* (2013.01)

(58) Field of Classification Search
CPC .................. G05B 19/4184; G05B 2219/32128
See application file for complete search history.

(56) References Cited

U.S. PATENT DOCUMENTS

| | | | | |
|---|---|---|---|---|
| 2022/0092112 | A1* | 3/2022 | Martin | G06F 16/904 |
| 2023/0076243 | A1* | 3/2023 | Watt | G06Q 50/16 |
| 2025/0021935 | A1* | 1/2025 | Mochty | G06Q 10/10 |
| 2025/0044749 | A1* | 2/2025 | Sun | G05B 13/0265 |

* cited by examiner

*Primary Examiner* — Yuhui R Pan
(74) *Attorney, Agent, or Firm* — Fletcher Yoder, P.C.

(57) ABSTRACT

A method may include receiving, via graphical user interface (GUI) of a processing system, a selection of a dataset associated with one or more operations of one or more industrial automation components of an industrial system. The method may also include receiving, via the GUI of the processing system, a set of input variables associated with the dataset, receiving a target variable associated with the dataset, and receiving a model type for analyzing the dataset. The method may also involve determining, via the processing system, a contribution of each of the set of input variables to the target variable based on the model type; and generating, via the processing system, a visualization representative of one or more statistical relationships between each of the set of input variables and the target variable based on the contribution of each of the set of input variables to the target variable.

20 Claims, 9 Drawing Sheets

ROOT CAUSE ANALYSIS FRAMEWORK IN INDUSTRIAL PROCESS ANALYTICS

CROSS-REFERENCE TO RELATED APPLICATIONS

This application is related to U.S. patent application Ser. No. 18/503,866, entitled "Employing a Batch Model in Root Cause Analysis of Industrial Batch Performance Analytics," and U.S. patent application Ser. No. 18/503,913, entitled "Integrated Generative AI Framework for Analytics Using HMI Assistance," each of which is herein incorporated by reference in their entirety for all purposes.

BACKGROUND

This disclosure generally relates to industrial automation systems and, more particularly, to providing a root cause analysis framework for analyzing industrial process data.

In industrial automation systems, anomalies, faults, and other errors may occur for a number of reasons. However, traditional methods for performing root cause analysis to identify causes for these issues may prove to be challenging with respect to time to resolve the issues and the number of resources employed in the processes. With this in mind, it may be beneficial to leverage data provided by industrial devices (e.g., operational technology (OT) devices) to perform more efficient data analytics to perform root cause analysis in a consistent manner.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a method may include receiving, via graphical user interface (GUI) of a processing system, a selection of a dataset associated with one or more operations of one or more industrial automation components of an industrial system. The method may also include receiving, via the GUI of the processing system, a set of input variables associated with the dataset, receiving a target variable associated with the dataset, and receiving a model type for analyzing the dataset. The method may also involve determining, via the processing system, a contribution of each of the set of input variables to the target variable based on the model type; and generating, via the processing system, a visualization representative of one or more statistical relationships between each of the set of input variables and the target variable based on the contribution of each of the set of input variables to the target variable.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
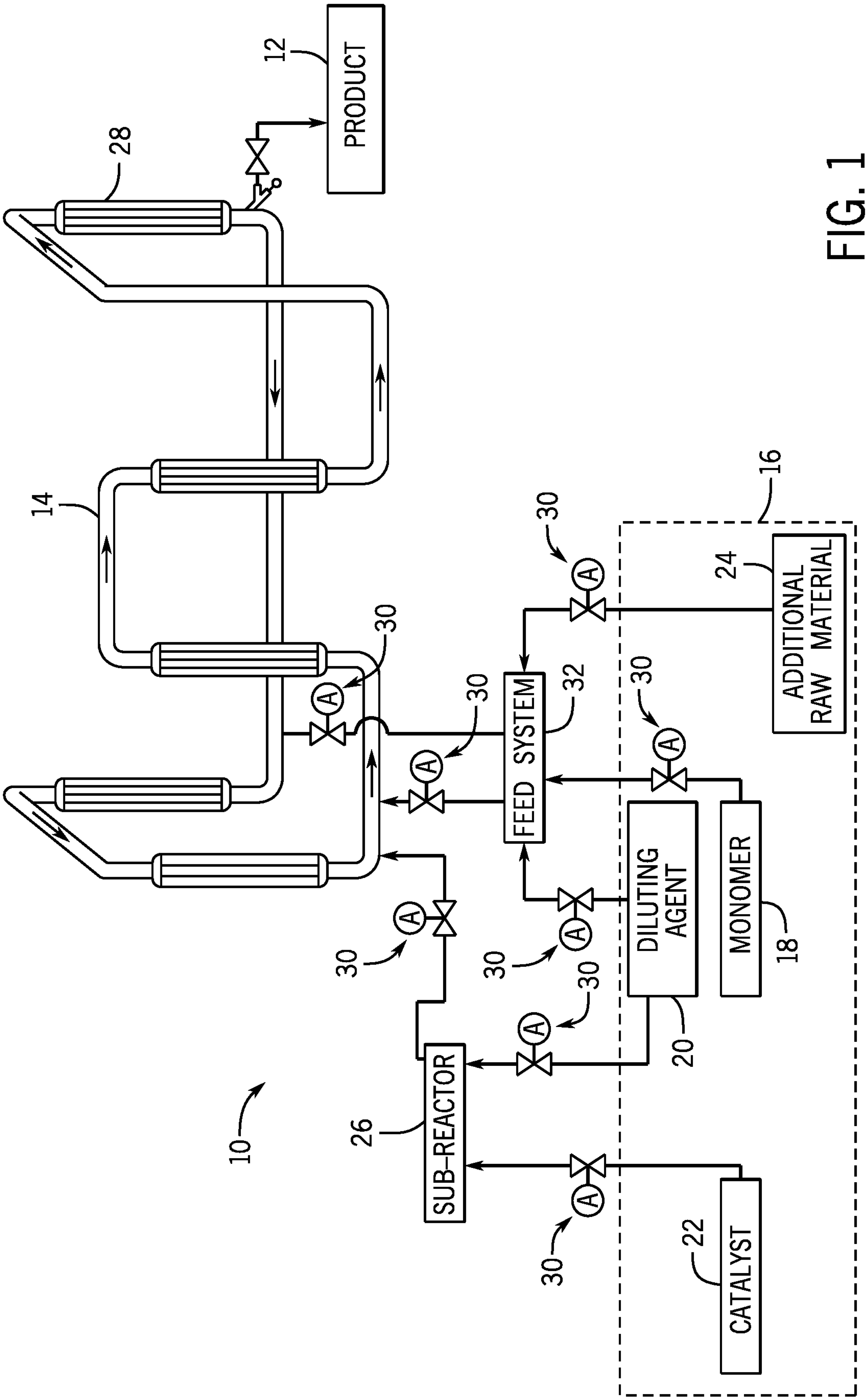
FIG. 1 is a diagrammatic representation of an example petrochemical-related process, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed towards a root cause analysis (RCA) system that may apply causal analysis and artificial intelligence (AI) technologies to automatically perform RCA processes that may be more efficient and accurate as compared to other RCA analysis techniques. The RCA system may include any suitable computing system that provides a user interface (UI) visualization for a user to provide inputs, a processing system for performing various AI algorithms, and the like. By way of example, the RCA system may present a UI visualization (FIG. 1) for receiving user inputs that define or select one or more datasets from available datasets for analysis.

The user may select a dataset to import into the RCA system. The dataset may include a spreadsheet or other collection of data related to an industrial process, manufacturing plant, or the like. The user may also select a model type to analyze the selected dataset. In addition, the user may select specific portions or subsets of the selected dataset, such as a batch number, a record number and the like for analysis. The user may also select a target variable to monitor or model with respect to one or more selected input variable. The user may select to identify the top number of features that contribute to the target variables, as well as a target value for the target variable.

After providing these inputs, the RCA system may apply the selected model type (e.g., classification, regression) to the selected dataset to identify or detail a relationship between the input variables and the target variables. After applying the model to the dataset, the RCA system may identify the top contributing input variables that affect the target variable. The user may then manually designate the identified variables as causes, targets, or treatments to explore cause-effect relationships between the selected variables. In some embodiments, the RCA system may also provide an option to perform a refute method to evaluate and test causal hypotheses and assess the validity of the causal relationships identified from the causal graphs.

In addition to performing the various analyses operations described above, the RCA system may provide a central repository for storing the record outputs determined by the RCA system. In this way, the record outputs can be repopulated to investigate previously generated analysis for future reference. Moreover, the centralized platform may store information obtained from different RCA analyses in a central location.

The RCA system may also implement an automated problem-solving methodology, such as the A3 process or other suitable system. By way of example, the RCA system may allow the user to provide a goal input with problem input texts that define the goal with respect to the problems. The RCA system may deductively select causes and auto-generate linear correlations between selected variables and corresponding causes.

By employing the systems described herein, the RCA system may integrate and automate AI-based and Causal Analysis-based solutions. As a result, the RCA system simplifies the process for users to practice and execute RCA. In addition, the RCA system may provide cause-effect relationship exploration interfaces to assist users in efficiently identifying cause-effect relationships. The framework integrates the centralized storage of RCA records for future reference and information retrieval. The RCA system also improves A3 methods with enhanced functionalities and also store the data to augment generative capabilities.

By way of introduction, FIG. 1 is a diagrammatic representation of a petrochemical-related process in which embodiments described below may be implemented. In particular, illustrated is an example reactor system 10, such as a polymerization reactor capable of processing olefin monomers, like ethylene or hexene, to produce homopolymers or co-polymers as products 12. Any suitable reactor may be used, including batch, slurry, gas-phase, solution, high pressure, tubular or autoclave reactors, or any combination thereof. For case of discussion, FIG. 1 refers to a loop reactor 14 for polymerization. However, it should be noted that the discussion set forth below is intended to be applicable, as appropriate, to any petrochemical process, industrial process, manufacturing process, or the like, as a way to provide context to the following discussion of FIGS. 2-9.

Production processes, like the polymerization reactor process shown in FIG. 1, may occur on an ongoing basis as part of a continuous operation to generate products (e.g., product 12). Sometimes a variety of both continuous and batch systems may be employed throughout a production process. Various suppliers may provide reactor feedstocks 16 to the reactor system 10 via pipelines, trucks, cylinders, drums, and so forth. The suppliers may include off-site and/or on-site facilities, including olefin plants, refineries, catalyst plants, on or off-site laboratories, and the like. Examples of possible feedstocks 16 include olefin monomers 18, diluents or diluting agents 20, catalysts 22, and/or other additives. The other feed components, additional raw materials 24, may also be provided to the reactor 14. Feedstocks 16 may change when using different manufacturing processes and/or when manufacturing a different final product. The feedstocks 16 may be stored or processed in any suitable vessel or process, such as in monomer storage and feed tanks, diluent vessels, catalyst tanks, co-catalyst cylinders and tanks, treatment beds like molecular sieve beds and/or aluminum packing, and so forth, prior to or after being received at the reactor system 10. The reactor system 10 may include one type of reactor in a system or multiple reactors of the same or different type, and desired processing conditions in one of the reactors may be different from the operating conditions of the other reactors.

The product 12 may be moved from the reactor system 10 for additional processing, such as to form polymer pellets from the product 12. In general, the product 12, or processed product (e.g., pellets) may be transported to a product load-out area for storage, blending with other products or processed products, and/or loading into railcars, trucks, bags, ships, and so forth, for distribution to customers.

Processes, like the reactor system 10, may receive or process feedstocks 16 at relatively high pressures and/or relatively high temperatures. For example, a hydrogen feedstock may be handled by the reactor system 10 via pipeline at approximately 900-1000 pounds per square inch gauge (psig) at psig at 90-110° F. Furthermore, some products may be generated using highly reactive, unstable, corrosive, or otherwise toxic materials as the feedstock 16 or as intermediate products, such as hydrogen sulfide, pure oxygen, or the like. Heat, pressure, and other operating parameters may be employed appropriately to obtain appropriate reaction conditions, which may increase a reactivity, instability, or corrosive nature of the feedstock 16. These materials may be desired to be processed and transported using reliable and highly available systems, for example, to reduce a likelihood of a release event from occurring.

Each of the feedstocks 16, sub-reactor 26, and/or feed system 32 may use different operating parameters to create suitable output intermediate products for use in subsequent reactions or as a product output. Operating parameters of the reactor system 10 may include temperature, pressure, flow rate, mechanical agitation, product takeoff, component concentrations, polymer production rate, and so forth, and one or more may be selected on to achieve the desired polymer properties. Controlling temperature may include using a gas burner, an electrical heating conduit, a heat exchange device 28, or the like, to increase or reduce the temperature of intermediate products of the reactor system 10. As an example, during operation, a cooling fluid may be circulated within the cooling jackets of the heat exchange devices 68 as needed to remove the generated heat and to maintain the temperature within the desired range, such as between approximately 150° F. to 250° F. (65° C. to 121° C.) for polyethylene.

Figure 2:
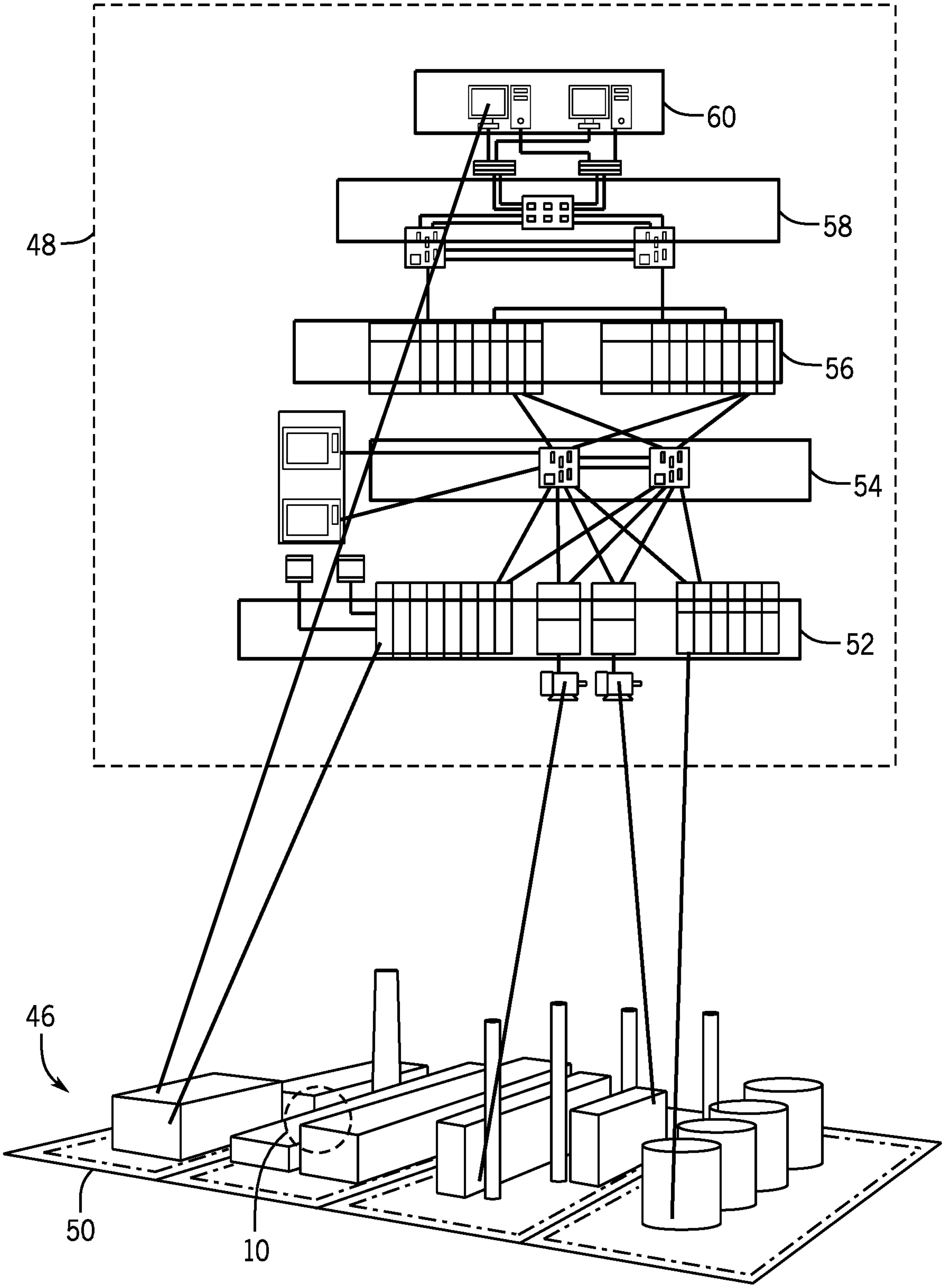
FIG. 2 is an illustration of an industrial automation system that includes a distributed control system (DCS), in accordance with an embodiment.

Feedstock 16 flow rates, control of operating parameters, and the like, may be managed by a control system (e.g., like the control system shown in FIG. 2). The control system may generate control signals, for example, control signals that are transmitted to one or more actuators 30 to cause the actuator to open or close (or partially open or partially close) as a way to control operating parameters of the feedstock 16, control of other operating parameters, and the like. Care may be taken when adjusting operating parameters since petrochemical manufacturing processing may be highly sensitive to erroneous operation. For example, fractions of a percentage of reliability change in a control system of the reactor system 10 may make a difference between a process being taken offline or a process working as expected.

With the foregoing in mind, the components of the reactor system 10 may be connected to power supplies, power supply conditions, and other systems that enable the components to be highly available. Moreover, it should be noted that the present embodiments described herein may be implemented in a variety of industrial environments and should not be limited to the reactor system 10 described above.

Referring now to FIG. 2, FIG. 2 is an illustration of an example industrial automation system 46 that includes a distributed control system 48 (e.g., a "DCS"). The industrial automation system 46 may include the reactor system 10 from FIG. 1 and/or any number of industrial automation components.

Industrial automation components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial automation components, the industrial automation components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, and the like. In one embodiment, every aspect of the industrial automation component may be controlled or operated by a single controller (e.g., control system). In another embodiment, the control and operation of each aspect of the industrial automation components may be distributed via multiple controllers (e.g., control system).

The industrial automation system 46 may divide logically and physically into different units 50 corresponding to cells, areas, factories, subsystems, or the like of the industrial automation system 46. The industrial automation components (e.g., load components, processing components) may be used within a unit 50 to perform various operations for the unit 50. The industrial automation components may be logically and/or physically divided into the units 50 as well to control performance of the various operations for the unit 50.

The distributed control system 48 may include computing devices with communication abilities, processing abilities, and the like. For example, the distributed control system 48 may include processing modules, a control system, a programmable logic controller (PLC), a programmable automation controller (PAC), or any other controller that may monitor, control, and operate an industrial automation device or component. The distributed control system 48 may be incorporated into any physical device (e.g., the industrial automation components) or may be implemented as a standalone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on.

In an example distributed control system 48, different hierarchical levels of devices may correspond to different operations. A first level 52 may include input/output communication modules (IO modules) to interface with industrial automation components in the unit 50. A second level 54 may include control systems that control components of the first level and/or enable intercommunication between components of the first level 52, even if not communicatively coupled in the first level 52. A third level 56 may include network components, such as network switches, that support availability of a mode of electronic communication between industrial automation components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may be a or a part of a closed loop control system (e.g., does not use feedback for control), an open loop control system (e.g., uses feedback for control), or may include a combination of both open and closed system components and/or algorithms. Further, in some embodiments, the distributed control system 48 may utilize feed forward inputs. For example, depending on information relating to the feedstocks 16 (e.g., compositional information relating to the catalyst 22 and/or the additional raw material 24, the distributed control system 48 may control the flow of any one or a combination of the feedstocks 16 into the sub-reactor 26, the reactor 14, or the like.

Each of the levels 52, 54, 56, 58, 60 may include component redundancies, which may help provide a high availability control system. For example, within the first level, redundant and concurrently operating backplanes may provide power to each of the IO modules.

Figure 3:
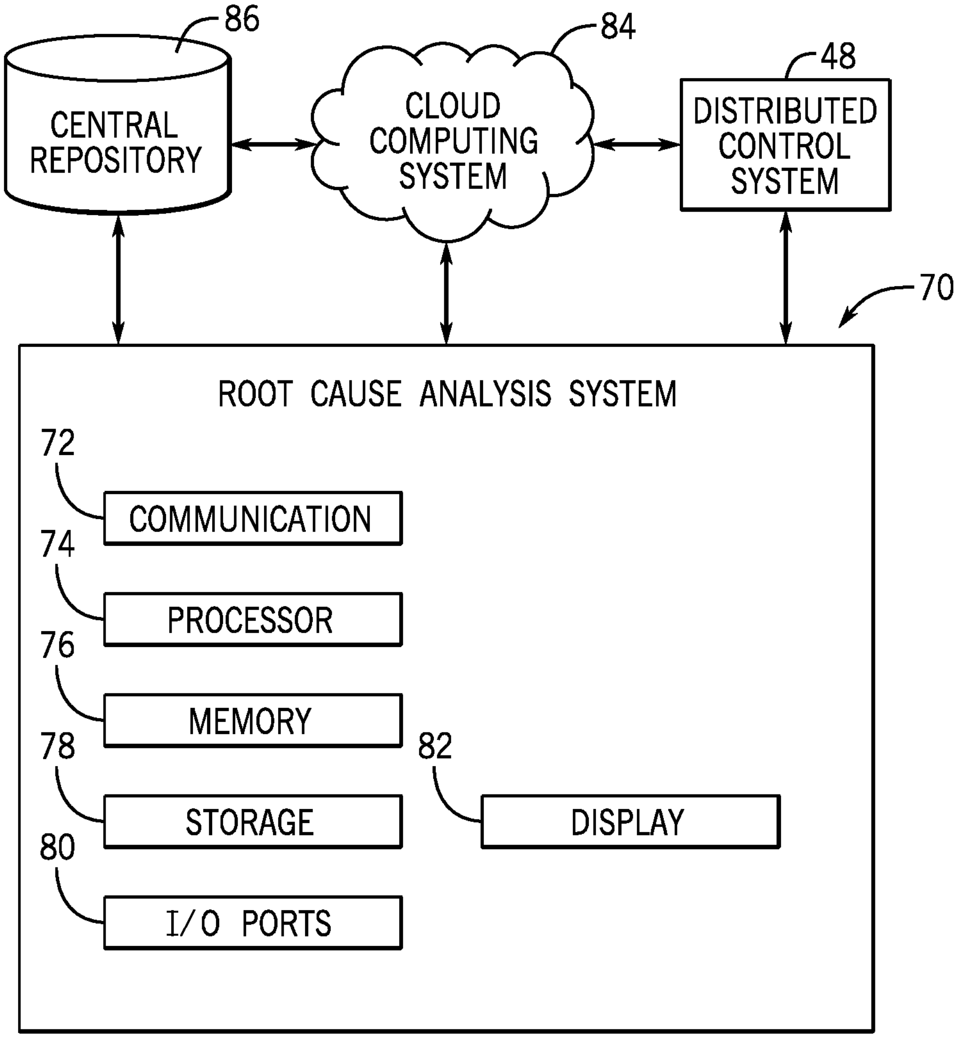
FIG. 3 is an illustration of a root cause analysis (RCA) system, in accordance with an embodiment.

In any case, data collected from the distributed control system 48, stored in a central repository, or the like may be made available to a root cause analysis (RCA) system 70. FIG. 3 illustrates example components that may be part of the RCA system 70, in accordance with embodiments presented herein. For example, the RCA system 70 may include a communication component 72, a processor 74, a memory 76, a storage 78, input/output (I/O) ports 80, a display 82, and the like. The communication component 72 may be a wireless or wired communication component that may facilitate communication between the industrial automation component that may be part of the distributed control system 48, a cloud-based computing system 84, a central repository 86 and other communication capable devices.

In some embodiments, the cloud-based computing system 84 may host a number of services via computing system resources that may be distributed over multiple locations. In this way, the various computing system resources may be scaled as needed to perform various operations. In some embodiments, the RCA system 70 may be implemented via the cloud-based computing system 84, as a separate computing system, or both.

Further, datasets acquired via the industrial automation components, the distributed control system 48, or the like may be stored in the central repository 86. In addition, the simulated datasets acquired by digital twin systems that mirror or simulate the operations of an industrial automation system may be included in the central repository 86. In any case, the central repository 86 may include one or more databases or data structures for storing and querying datasets in a structured and efficient manner. In addition, the results of the root cause analysis operations performed by the RCA system 70 and described herein may be stored in the central repository 86, such that previously performed analysis operations may be reviewed, modified, and redeployed for different datasets.

The processor 74 may be any type of computer processor or microprocessor capable of executing computer-executable code. The processor 74 may also include multiple processors that may perform the operations described below. The memory 76 and the storage 78 may be any suitable articles of manufacture that can serve as media to store processor-executable code, data, or the like. These articles of manufacture may represent computer-readable media (e.g., any suitable form of memory or storage) that may store the processor-executable code used by the processor 74 to perform the presently disclosed techniques. Generally, the processor 74 may execute software applications that include programs that enable a user to perform root cause analysis on accessible datasets to better ascertain issues or solutions to various discrepancies, anomalies, or the like. That is, the software applications may communicate with the RCA system 70 may gather information associated with operations the industrial automation components via the sensors disposed on the industrial automation components and provide a user interface visualization to enable a user to perform different types of root cause analysis on the collected data.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 74 and may be used to monitor, control, access, or view one of the industrial automation components. As such, the RCA system 70 may communicatively couple to industrial automation components or to a respective computing device of the industrial automation components via a direct connection between the devices, via the cloud-based computing system 84, or the like.

The I/O ports 80 may be interfaces that may couple to other peripheral components such as input devices (e.g., keyboard, mouse), sensors, input/output (I/O) modules, and the like. I/O modules may enable the RCA system 70 to communicate with the industrial automation components or other devices in the industrial automation system via the I/O modules.

The display 82 may depict visualizations associated with software or executable code being processed by the processor 74. In one embodiment, the display 82 may be a touch display capable of receiving inputs from a user of the RCA system 70. As such, the display 82 may serve as a user interface to provide parameters and instructions to guide the operation of the RCA system 70. The display 82 may be used to display a graphical user interface (GUI) for operating the RCA system 70. The display 82 may be any suitable type of display, such as a liquid crystal display (LCD), plasma display, or an organic light emitting diode (OLED) display, for example. Additionally, in one embodiment, the display 82 may be provided in conjunction with a touch-sensitive mechanism (e.g., a touch screen) that may function as part of a control interface for the industrial automation components to control the general operations of the system 10 or the like.

Although the components described above have been discussed with regard to the RCA system 70, it should be noted that similar components may make up other computing devices described herein. Further, it should be noted that the listed components are provided as example components and the embodiments described herein are not to be limited to the components described with reference to FIG. 3.

With the foregoing in mind, in some embodiments the RCA system 70 may enable users to store and retrieve RCA reports from analyses performed in the past, such that the RCA reports may be reused, revised, or applied to different datasets. IN this way, there is a redundancy in reproducing the same RCA reports in different locations (e.g., factories, facilities), at different times, or the like. By providing an organized platform to perform analyses and store the results of the analyses, the present embodiments may allow for a more efficient transfer of knowledge to the next generation of RCA practitioners. Further, by storing the previously performed RCA analyses, the RCA system 70 may employ machine learning algorithms and artificial intelligence (AI) models to identify patterns that may allow the RCA system 70 to more efficiently (e.g., time, computing resources)

identify root causes for anomalous datasets, alarm conditions, and the like. Indeed, as IoT and connected enterprise datasets are increasingly available via storage components (e.g., databases), real-time access to industrial automation components, or the like, the RCA system 70 may apply causal analysis functions and AI solutions, such that the RCA system 70 may provide automated root causes analysis reports based on datasets that are outside an expected range, datasets that don't match expected datasets, and the like. Based on the analysis, the RCA system 70 may proactively send commands to industrial automation components to adjust operations to resolve identified root cause issues and reduce downtime that may occur due to unplanned errors, issues, and the like. That is, the commands may include adjusting operations of various industrial automation components to reduce stress or increase likelihood of achieving target goals for target variables.

In addition to performing the root cause analysis, the RCA system 70 may provide an explainable AI (XAI) platform that provides understandable and interpretable explanations of predictions and results determined from artificial intelligence systems and machine learning models. As such, the RCA system 70 may provide a user interface that allows users to modify or adjust aspects of the AI or machine learning model used to perform the RCA analysis. In this way, the user may better understand how the model arrived at particular results via a transparent UI. Moreover, the RCA system 70 may provide visualizations (e.g., charts, graphs) that may assist users to better understand the root causes contributing a particular issue or anomaly. Moreover, the RCA system 70 may provide the ability to perform refute methods on the identified causal results to confirm that the performed analysis is robust.

Figure 4:
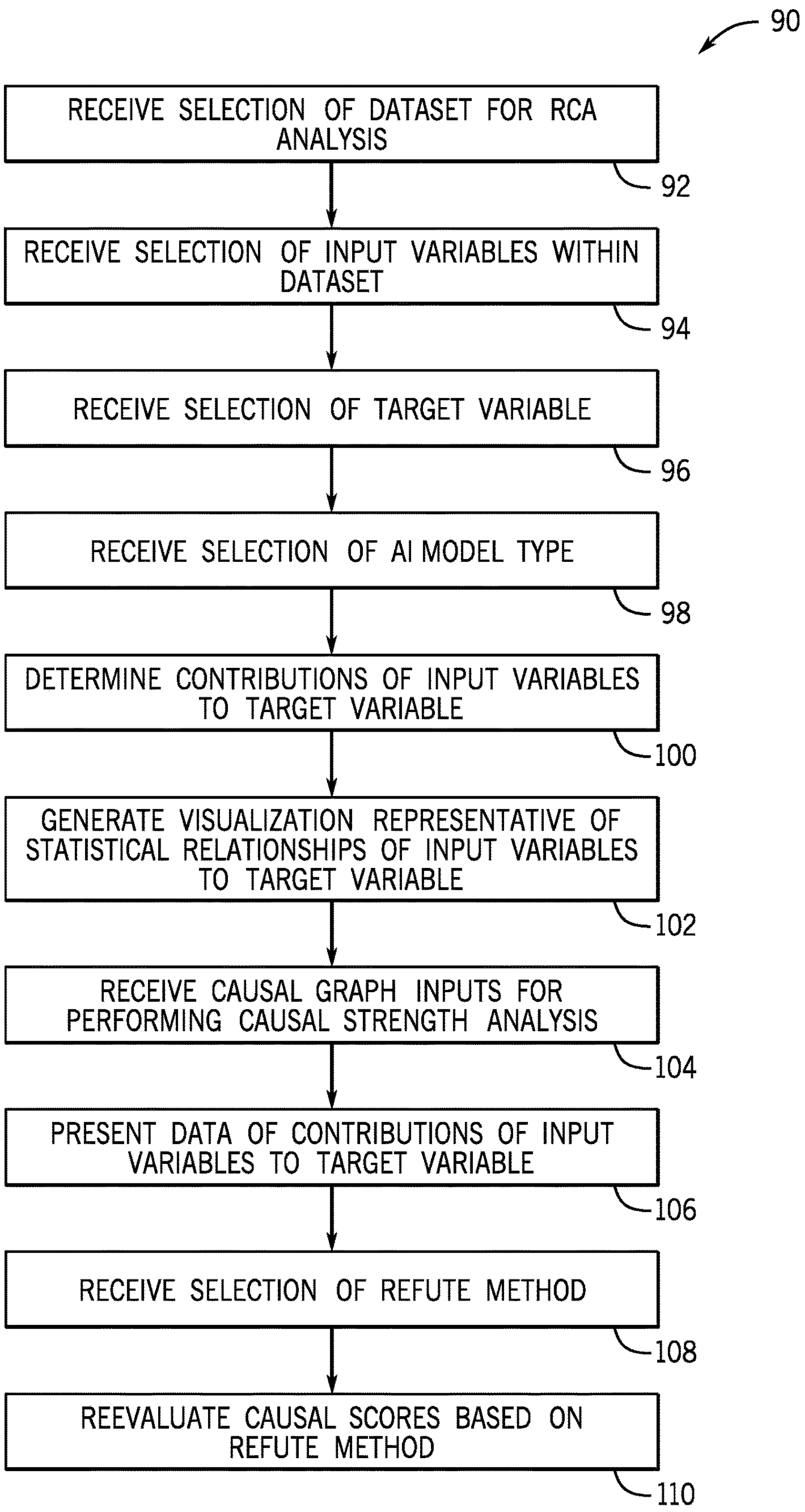
FIG. 4 is a flow chart of a method for performing root cause analysis on datasets related to the industrial automation system to identify variables related to root causes of an anomaly and causal contributions of each input variable to a target variable, in accordance with an embodiment.

With this in mind, FIG. 4 illustrates a method 90 for performing root cause analysis operations via the RCA system 70. Although the following description of the method 90 is described as being performed by the RCA system 70, it should be understood that the method 90 may be performed by any suitable computing system and in any suitable order. Moreover, the following description of the method 90 will be described with reference to an example user interface (UI) visualization 120 illustrated in FIG. 5. Indeed, the user may implement various portions of the method 90 via the example UI visualization 120 or other suitable input device or interface.

Referring now to FIG. 3, at block 92, the RCA system 70 may receive one or more selections of one or more datasets that the user intends to evaluate for root cause analysis. The datasets may be stored on the central repository 86 or other suitable storage components. In some embodiments, the datasets may be real-time datasets acquired via the industrial components, the distributed control system 48, or the like.

Figure 5:
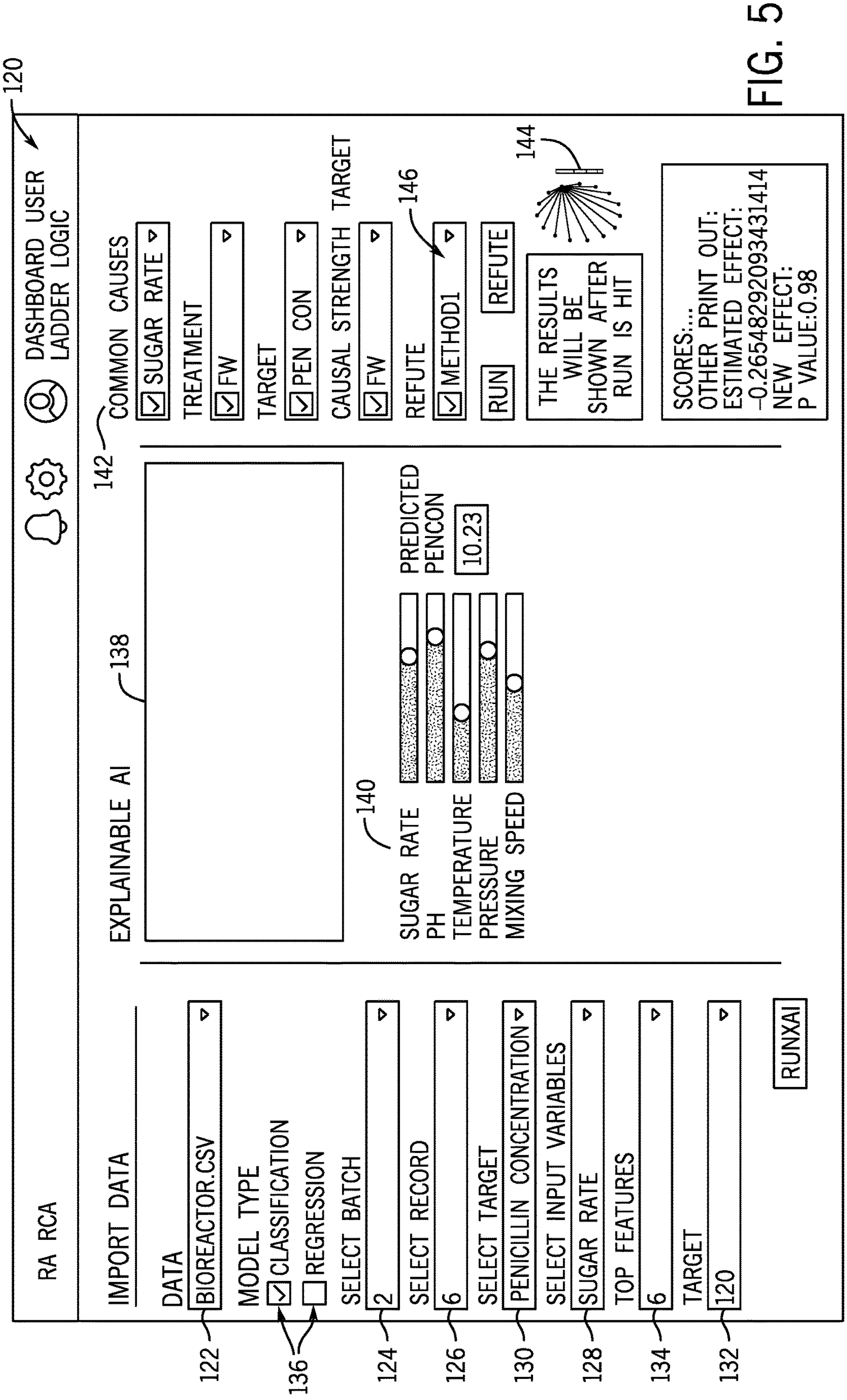
FIG. 5 is an example user interface visualization enabling a user to interact with the RCA system and perform the method of FIG. 4, in accordance with an embodiment.

In some embodiments, the user may select a data file via a data input field 122 of the UI visualization 120. The data file may include datasets organized in a database, spreadsheet, or other suitable format for analysis. After receiving a selection or request at the data input field 122, the RCA system 70 may present options to the user related to the datasets accessible to the RCA system 70 via a network, the cloud-based computing system 84, or the like. In addition to selecting a particular dataset, the user may select subsets of the datasets via subset input fields 124 and 126. As illustrated in FIG. 5, the subset input fields 124 and 126 may include one or more batch numbers and one or more record numbers that further narrow the raw data that the user intends to analyze via the RCA system 70.

At block 94, the RCA system 70 may receive a selection of input variables that may be part of the datasets received at block 92. By way of example, in a bioreactor system, the input variables may include datasets related to operations of the bioreactor, such as sugar rate, pH, temperature, pressure, mixing speed, and the like. Each of the input variables may be related to operations of one or more industrial automation components that may be adjusted based on commands determined by and sent from the RCA system 70 in accordance with embodiments described herein.

In some embodiments, the user may provide an input signal (e.g., click, touch, selection) at an input variable field 128. The input variable field 128 may include a collection of input variables that may have some (e.g., direct, indirect) effect to other variables (e.g., target variable) of the selected dataset. In some embodiments, the RCA system 70 may retrieve a list of possible input variables based on the selected dataset. The user may select one or more input variables to evaluate via a respective AI model.

At block 96, the RCA system 70 may receive a selection of a target variable. As such, the user may specify a target variable via a target variable field 130. The target variable may include any of the variables identified by the RCA system 70 for the input variables or other variables that may be part of the selected dataset. In some embodiments, the RCA system 70 may provide options to select variables that are expected to change or have some relationship with the selected input variables.

The user may also provide a target value via the target input field 132. The target value may be a raw value or sensor value that the user expects to receive for the selected target variable. The RCA system 70 may also receive a selection of a number of top features to identify as contributing to the target variable via a top feature input field 134. The provided input for the top feature input field 134 may indicate to the RCA system 70 an amount of analysis to perform, such that the RCA system 70 may continue to analyze the selected dataset to identify the selected top number of features that may contribute to affecting the target variable.

At block 98, the RCA system 70 may receive a selection of a type of AI model, machine learning model, statistical model, or other model that may be applied to the selected dataset for root cause analysis. As shown in FIG. 5, the UI visualization 120 provides the user an opportunity to select a classification model type or a regression model type via a model type input field 136. Although two model types are illustrated, it should be noted that the RCA system 70 may provide additional or fewer model types for the user to select.

After the user provides the input selections described above, the RCA system 70 may, at block 100, determine contributions (e.g., weights) of selected input variables to the selected target variable. That is, the RCA system 70 may analyze the selected dataset(s) with the selected AI model to identify the top input variable contributors to the target variable. As such, the RCA system 70 may determine a predicted value for the target variable, a feature impact of each input variable with respect to contributing to the prediction of the target variable, and other statistical relationships between the input variable and the target variable.

At block 102, the RCA system 70 may generate a visualization 138 representative of contributions or statistical relationships between the input variables and the prediction of target variable. The visualization may include a graph or other graphic that helps the user better ascertain or comprehend the effects of each input variable to the prediction of the target variable. In some embodiments, the visualizations may include interactive slide visualizations 140 that allow the user to modify various input variables to view the effect on the prediction of the target variable. That is, the user may slide or adjust input variable values to determine the resulting predicted value of the target variable. In this way, the user may better determine how to achieve prediction of the target values and resolve root cause issues. Although FIG. 5 illustrates interactive slide visualizations 140, it should be understood that the user may provide inputs to adjust input variables with any suitable input mechanism (e.g., data field, virtual knob).

By way of operation, a user may select a dataset, model type, batch ID, record number, target variable, input variables, and choose a number of top features to be selected via the UI 120 or other suitable input device. After a user sends a command to the RCA system 70 to execute (e.g., Calculate XAI), the RCA system 70 may generate a chart comparing actual vs. predicted values. In addition, the RCA system 70 may generate a feature impact plot that may illustrate the contributions of input variables to the target variable. Additionally, the RCA system 70 may generate a table with detailed values.

By providing the UI 120, the RCA system 70 may enable users to specify the datasets employed for root cause analysis, modify input variable parameters to test effects to target variables, and better comprehend how input variables affect the prediction of target variable. Moreover, the UI 120 may be connected with the software functions and routines of the RCA system 70 enabling the RCA system 70 to more efficiently perform computer operations related to the adjustment to the explainable AI operations based on the provided inputs. In addition, based on the predicted value or modified inputs, the RCA system 70 may send commands to the industrial automation components, the distributed control system 48, or the like to automatically implement changes and proactively resolve root cause issues.

Figure 6:
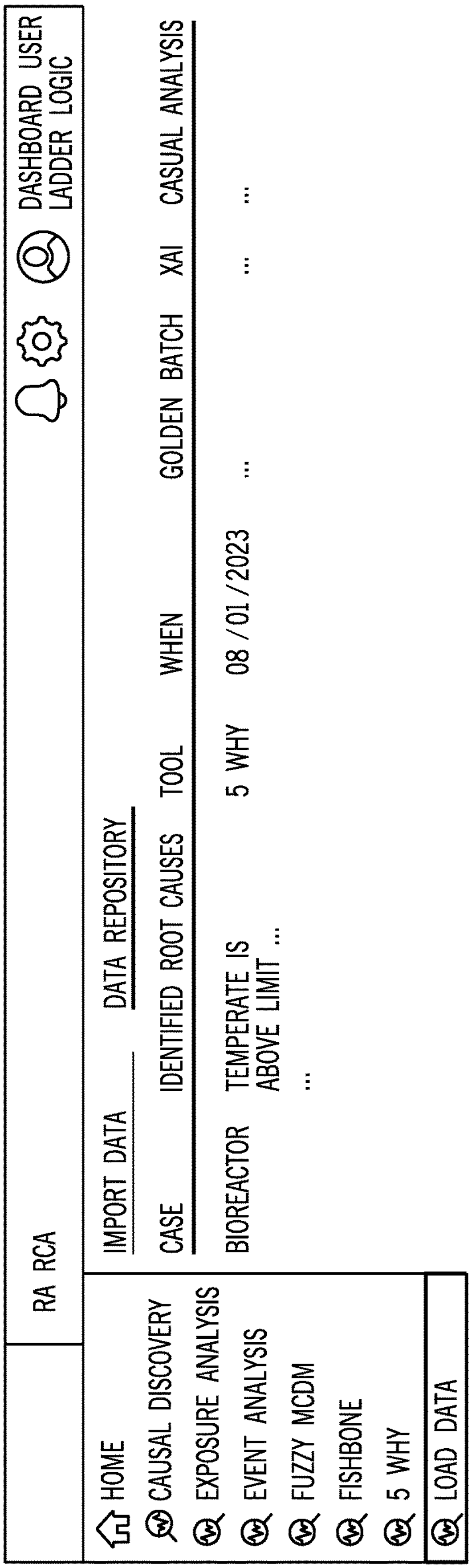
FIG. 6 is an example user interface visualization illustrating the stored RCA datasets, in accordance with an embodiment.

The results of the root cause analysis may be stored in the central repository 86 in a consistent manner, such that users may retrieve the analysis to assist in evaluating other anomalies. As shown in FIG. 6, the central repository 86 may store the analysis with respect to a type of industry (e.g., case), an identified root cause, a tool used to perform root cause analysis, a time in which the analysis was performed, and the like.

In addition to presenting the statistical relationships between the input variables and the target variable based on the selected AI model, the RCA system 70 may enable the user to test or evaluate the causal strength relationships between the input variables and the target variable. That is, at block 104, the RCA system 70 may receive causal graph inputs for performing causal strength analyses. The causal graph inputs (e.g., via visualization 142) may include user selections for suspected common causes, a treatment (e.g., method for estimating causal effect on another variable, front-door way (FW), back-door adjustment, inverse probability weighting (IPW), instrumental variables (IV), etc.), a target variable designation, a causal strength target, and the like.

By way of example, the causal graph inputs may include common causes including variables that potentially influence both the treatment and target variables; treatment options that may assist in understanding the effect or impact of the treatment variables on the target; a target variable include variable(s) for which the RCA system 70 may seek to understand how treatment variables affect the target variable; a causal target that may include a variable (e.g., causal target) that may be used to generate a graph that quantifies the strength of causal influence from common causes and/or treatment on the causal target; an estimate method that may specify a learning method used to estimate the relationship between the variables selected in common causes, treatment and a target, a refute method that may evaluate the robustness of the learned model; and the like.

After selecting the causal graph inputs, the RCA system 70 may, at block 106, present data related to contributions or weights of input variables relative to the target. In some embodiments, the RCA system 70 may generate a causal strength graph 144 that illustrates the strengths or weights of each selected common cause (e.g., input variable) to the target variable. The causal graph may allow the user to better understand or visualize how various input variables or suspected causes may affect the target.

In addition to providing causal analysis, the RCA system 70 may enable the user to perform refute analysis. For example, at block 108, the RCA system 70 may receive a selection of a refute method at refute input field 146. The refute method may be related to some statistical analysis function that evaluates or tests causal hypotheses and assess the validity of the causal relationships inferred from the data. For instance, the refute method may include functions such as add random common cause, placebo treatment, dummy outcome, simulated outcome, add unobserved common causes, data subset validation, bootstrap validation, and the like. After receiving the request to perform the refute method analysis, the RCA system 70, may evaluate the causal hypotheses for the causal graph input and present the results of the analysis to users in any suitable format.

In addition to performing the root cause analysis operations with causal methodologies as described above with reference to FIGS. 4-6, the RCA system 70 may provide the user the ability to perform automatic A3 workflow analysis. The A3 analysis may include a visual system or user interface that allows the RCA system to present information in a structured manner and allow the user to identify, analyze, and evaluate problem and proposed solutions in a dynamic fashion. The A3 analysis operations may be performed in a number of different ways. However, these different techniques may result in different results making it more difficult for users to gain an appreciate for another user's solution. Indeed, in contrast to the causal analysis performed via the method 90, the A3 workflow relies on user inputs to designate causes to a particular problem or issues, while the RCA system 70 may perform linear correlations for the causes with respect to the issue.

Figure 7:
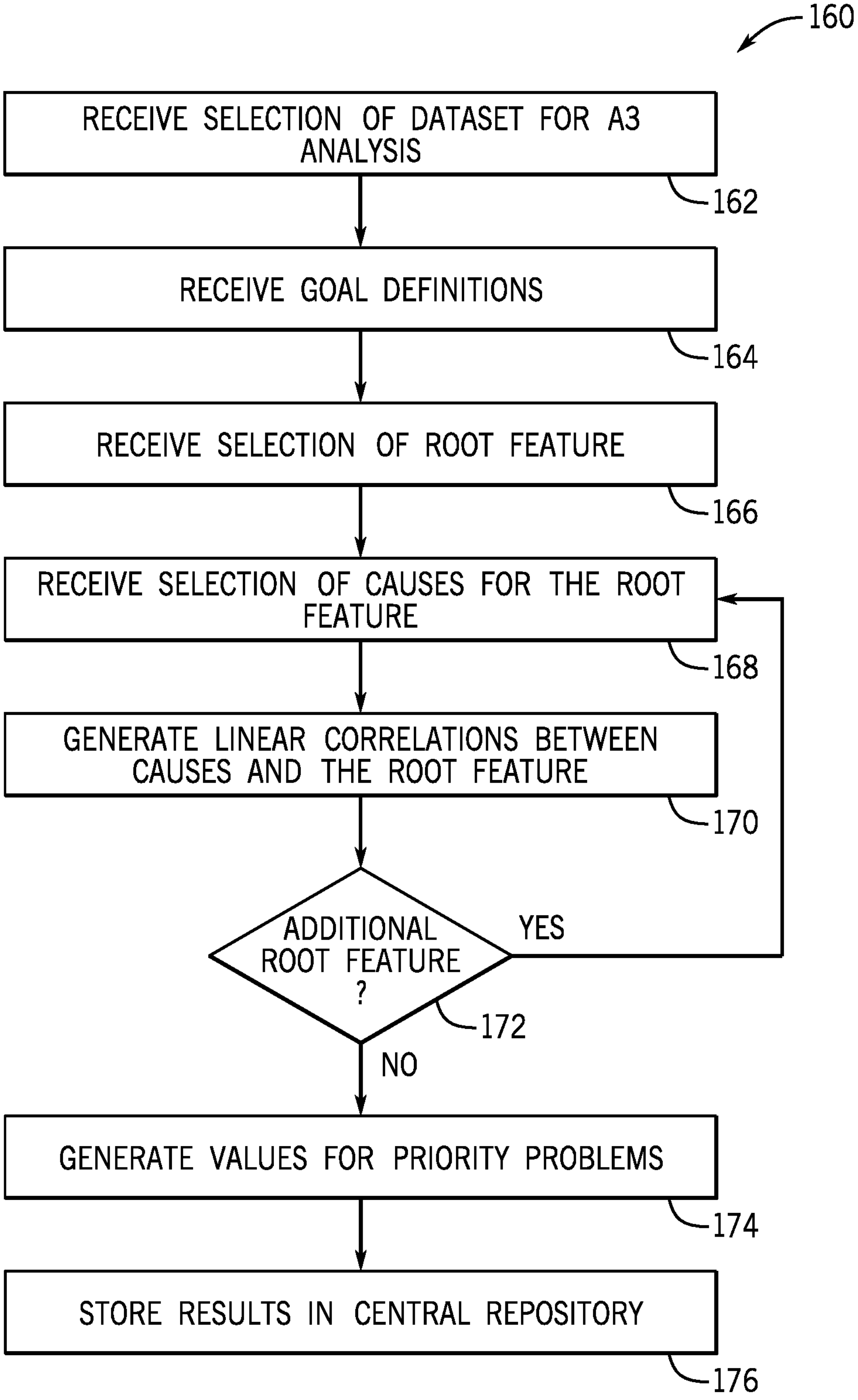
FIG. 7 is a flow chart of a method for enabling users to perform A3 analysis, in accordance with an embodiment.

With this in mind, FIG. 7 illustrates a method 160 for performing A3 analysis operations via the RCA system 70. Although the following description of the method 160 is described as being performed by the RCA system 70, it should be understood that the method 160 may be performed by any suitable computing system and in any suitable order. Moreover, the following description of the method 160 will be described with reference to an example user interface (UI) visualization 190 illustrated in FIG. 8. Indeed, the user may implement various portions of the method 160 via the example UI visualization 190 or other suitable input device or interface.

Referring now to FIG. 7, at block 162, the RCA system 70 may receive a selection of one or more datasets or A3 analysis. The datasets may be selected from those stored in the central repository 86 or other suitable storage. In some embodiments, the datasets may be related to real-time data provided by the industrial automation components or the like.

At block 164, the RCA system 70 may receive goal definitions for the A3 analysis operation. The goal definitions may be received via data input fields 192. As such, the user may provide test inputs indicative of the ultimate goal, details related to the problem that the A3 analysis will be directed to solve, and the like. The details of the problem may include a characterization of the user's assessment of the current situation (e.g., what is currently happening?), a characterization of an expectation (e.g., what should be happening?), and a characterization of an identified gap or difference between the two (e.g., what is the identified gap?).

Based on the goal definitions (e.g., identified gap), the user may provide a selection of a root feature to the RCA system 70 at block 166. The root feature may correspond to the identified gap or any variable that the user suspects may be a root cause feature related to some anomaly, issue, or the like. After selecting the root feature, the RCA system 70 may provide a UI visualization 194 to allow the user to break down the problem into input variables that the user may select. That is, at block 168, the RCA system 70 may receive a selection of causes for the identified root feature.

Figure 8:
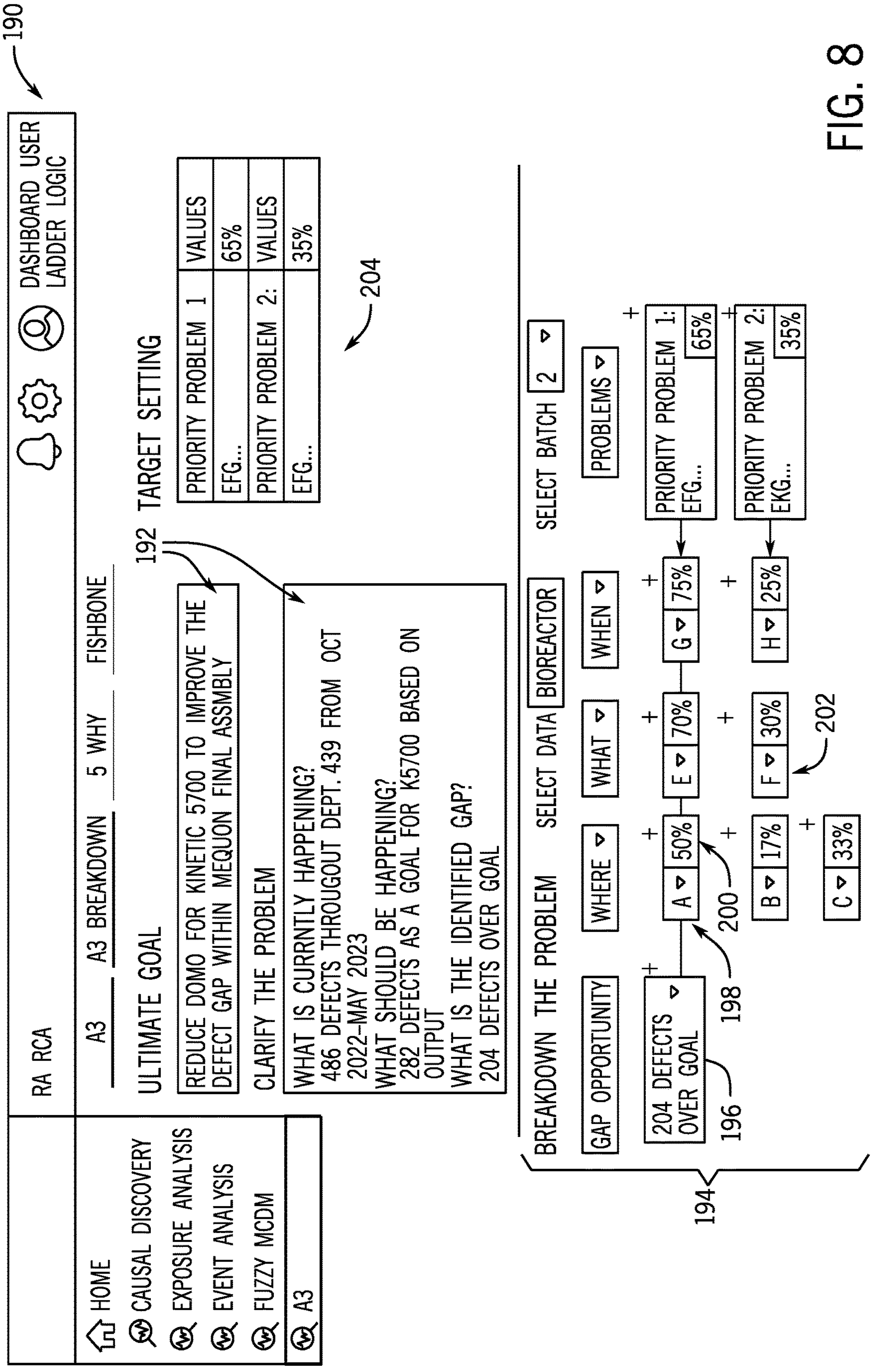
FIG. 8 is an example user interface visualization enabling a user to interact with the RCA system to perform A3 analysis, in accordance with an embodiment.
Figure 9:
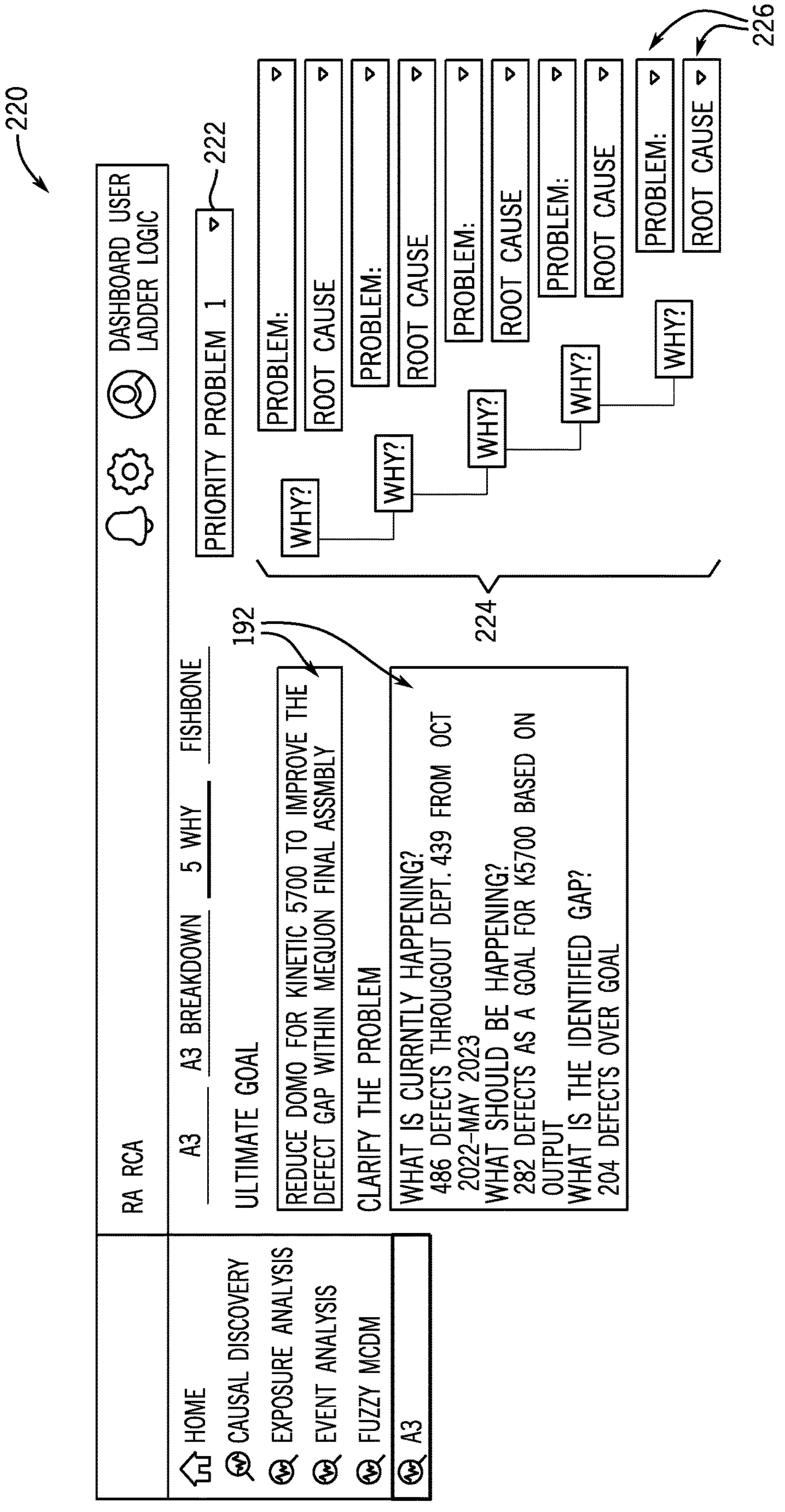
FIG. 9 is an example user interface visualization enabling a user to interact with the RCA system to perform 5 Why analysis, in accordance with an embodiment.

Referring to FIG. 8, the user may initially select a root feature 196 to analyze and then designate any suitable number of variables 198 as contributors to the root feature 196. In some embodiments, the variables 198 may include drop down selection boxes that may allow the user to select from a list of input variables that are part of the dataset received at 162. The user may add any suitable number of variables 198 and select different input variables for each variable 198. In some embodiments, the RCA system 70 may parse the received dataset and identify the different input variable datasets available for analysis and populate the list for the variable 198.

After receiving the selection of variables 198, the RCA system 70 may perform linear correlations for the selected variable 198 with respect to the root feature 196. That is, the RCA system 70 may automatically determine a linear correlation between the selected variable 198 and the respective root feature 196 and provide a percent correlation value in a results field 200 to indicate the results of the linear correlations.

At block 172, the user may provide an indication to the RCA system 70 indicative of a selection of an additional root feature. That is, the user may select one or more of the variables 198 to further explore as a root feature. As such, the RCA system 70 may return to block 168 and receive additional selections of causes for the respective new root feature. That is, if the user selects one of the variables 198 as a new root feature, the RCA system 70 may receive additional variables 202 that may be used to determine contributing variables to the new root feature. The RCA system 70 may, consequently, generate linear correlations between the new causes and the new root feature and provide the results in respective fields as discussed above.

After the user chooses against adding root features, the RCA system 70 may proceed to block 174 and generate values for priority problems. In some embodiments, the RCA system 70 may identify the last two selected causes as the priority problems for the user to resolve. That is, after the user identifies layered causes for a particular root feature 196, the last selected variables may be identified as the root causes for a respective anomaly or issue that may be the priority problems for the user to resolve. As such, the RCA system 70 may determine the linear correlation between each priority problem and the original root feature 196. In some embodiments, the RCA system 70 may generate a table visualization 204 to present the priority problems that the user has identified. At block 176, the RCA system 170 may store the results of the A3 analysis in the central repository 86.

In addition to performing the A3 analysis described above, the RCA system 70 may allow the user to select from the selected variables (e.g., causes) in a 5 Why chart. For example, the RCA system 70 may presented a visualization 220, as depicted in FIG. 8, in which a user may select a priority problem to evaluate with why statements. As shown in FIG. 8, the ultimate goal and problem details may be provided in data input fields 192 as described above. In addition, a priority problem may be selected by the user based on the various causes identified in the method 160 described above. Indeed, a priority problem field 222 may be provided via the visualization 220 for the user to select or provide a text input. In some embodiments, the priority problem may be retrieved from the A3 analysis described above.

After receiving the priority problem, the RCA system 70 may provide a 5 Why framework visualization 224 to allow the user to select and/or input problem statements and root causes via input fields 226. That is, the RCA system 70 may allow users to select drop down menus or from a set of problems or causes that may be retrieved from any suitable analysis operations described above. In this way, the user may present the root cause analysis in an additional format to allow others to better understand the issues that may be related to the respective datasets.

By performing the embodiments described herein, the RCA system 70 may provide visualization dashboards that allow user to gain insights from process data in various categories. For instance, the method 90 enables user to engage with an auto-RCA framework that integrates and automates RCA solutions, as well as AI-based and Causal Analysis-based solutions. As a result, the RCA system 70 simplifies the process for users (e.g., engineers) that may be unfamiliar with the processes and procedures to perform root cause analysis tasks. Moreover, by integrating explainable AI, Causal Analysis, and Parameter Control functions, the RCA system 70 provides cause-effect relationship exploration interfaces to assist users in efficiently identifying cause-effect relationships. Further, the framework integrates the centralized storage of RCA records for future reference and information retrieval. Additionally, the techniques described herein provide a framework that automates A3 methods with enhanced user-defined functionalities and also store the data to augment generative AI capabilities. Further, the processes described herein may also be employed to determine solutions for identified root causes that may involve sending commands, via the RCA system 70, to industrial automation components, the distributed control system 48, and the like to modify operations and resolve root cause issues or limit the effects of the identified issues.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

receiving, via graphical user interface (GUI) of a processing system, a selection of a dataset associated with one or more operations of one or more industrial automation components of an industrial system;

receiving, via the GUI of the processing system, a set of input variables associated with the dataset;

receiving, via the GUI of the processing system, a target variable associated with the dataset;

receiving, via the GUI of the processing system, a model type for analyzing the dataset;

receiving, via the GUI of the processing system, a selection of a target quantity of top features to identify;

determining, via the processing system, a contribution of each of the set of input variables to the target variable based on the model type by calculating a feature impact of each input variable with respect to predicting the target variable;

identifying, via the processing system, a subset of the set of input variables as top input variable contributors to the target variable based on the calculated feature impacts and the selected target quantity of top features; and generating, via the processing system, a feature impact visualization representative of one or more statistical relationships between the identified top input variable contributors and the target variable based on the contribution of each of the identified top input variable contributors to the target variable.

2. The method of claim 1, comprising:

receiving, via the GUI of the processing system, one or more inputs to adjust one or more values of one or more input variables of the set of input variables;

generating, via the processing system, a predicted value for the target variable based on the one or more inputs; and displaying, via the GUI of the processing system, the predicted value.

3. The method of claim 2, wherein the one or more inputs correspond to one or more slide visualizations associated with the one or more input variables.

4. The method of claim 1, comprising:

determining, via the processing system, one or more commands to adjust one or more operations of the one or more industrial automation components based on the one or more statistical relationships; and sending, via the processing system, the one or more commands to the one or more industrial automation components.

5. The method of claim 1, comprising:

receiving, via the GUI of the processing system, one or more causal analysis inputs for generating a causal analysis graph, wherein the one or more causal analysis inputs are selected from the set of input variables;

receiving, via the GUI of the processing system, a treatment for generating the causal analysis graph; and generating, via the GUI of the processing system, a causal graph representative of one or more strengths of one or more input variables that correspond to the one or more causal analysis inputs with respect to the target variable.

6. The method of claim 5, comprising:

receiving, via the GUI of the processing system, a refute method;

determining, via the processing system, one or more causal scores associated with the one or more strengths based on the dataset and the refute method; and displaying, via the GUI of the processing system, the one or more causal scores.

7. The method of claim 1, wherein the model type comprises a classification model type or a regression model type.

8. A non-transitory computer-readable medium comprising computer-executable instructions that, when executed, are configured to cause a processing system to perform operations comprising:

receiving, via graphical user interface (GUI) of the processing system, a selection of a dataset associated with one or more operations of one or more industrial automation components of an industrial system;

receiving, via the GUI, a set of input variables associated with the dataset;

receiving, via the GUI, a target variable associated with the dataset;

receiving, via the GUI, a model type for analyzing the dataset;

receiving, via the GUI of the processing system, a selection of a target quantity of top features to identify;

determining, via the processing system, a contribution of each of the set of input variables to the target variable based on the model type by calculating a feature impact of each input variable with respect to predicting the target variable;

identifying, via the processing system, a subset of the set of input variables as top input variable contributors to the target variable based on the calculated feature impacts and the selected target quantity of top features; and generating, via the processing system, a feature impact visualization representative of one or more statistical relationships between the identified top input variable contributors and the target variable based on the contribution of the identified top input variable contributors to the target variable.

9. The non-transitory computer-readable medium of claim 8, wherein the operations comprise:

receiving, via the GUI of the processing system, one or more inputs to adjust one or more values of one or more input variables of the set of input variables;

generating, via the processing system, a predicted value for the target variable based on the one or more inputs; and displaying, via the GUI of the processing system, the predicted value.

10. The non-transitory computer-readable medium of claim 9, wherein the one or more inputs correspond to one or more slide visualizations associated with the one or more input variables.

11. The non-transitory computer-readable medium of claim 8, wherein the operations comprise:

determining, via the processing system, one or more commands to adjust one or more operations of the one or more industrial automation components based on the one or more statistical relationships; and sending, via the processing system, the one or more commands to the one or more industrial automation components.

12. The non-transitory computer-readable medium of claim 8, wherein the operations comprise:

receiving, via the GUI of the processing system, one or more causal analysis inputs for generating a causal analysis graph, wherein the one or more causal analysis inputs are selected from the set of input variables;

receiving, via the GUI of the processing system, a treatment for generating the causal analysis graph; and generating, via the GUI of the processing system, a causal graph representative of one or more strengths of one or more input variables that correspond to the one or more causal analysis inputs with respect to the target variable.

13. The non-transitory computer-readable medium of claim 12, wherein the operations comprise:

receiving, via the GUI of the processing system, a refute method;

determining, via the processing system, one or more causal scores associated with the one or more strengths based on the dataset and the refute method; and displaying, via the GUI of the processing system, the one or more causal scores.

14. The non-transitory computer-readable medium of claim 8, wherein the model type comprises a classification model type or a regression model type.

15. A non-transitory computer-readable medium comprising computer-executable instructions that, when executed, are configured to cause a processing system to perform operations comprising:

receiving, via graphical user interface (GUI) of the processing system, a selection of a dataset associated with one or more operations of one or more industrial automation components of an industrial system, wherein the dataset is associated with one batch of a plurality of batches associated with the industrial system;

receiving, via the GUI, a set of input variables associated with the dataset;

receiving, via the GUI, a target variable associated with the dataset;

receiving, via the GUI, a model type for analyzing the dataset;

receiving, via the GUI, a target quantity of top features to identify;

determining, via the processing system, a contribution of each of the set of input variables to the target variable based on the model type by calculating a feature impact of each input variable with respect to predicting the target variable;

identifying, via the processing system, a subset of the set of input variables as top input variable contributors to the target variable based on the calculated feature impacts and the selected target quantity of top features;

generating, via the processing system, a feature impact visualization representative of one or more statistical relationships between the identified top input variable contributors and the target variable based on the contribution of identified top input variable contributors to the target variable;

determining, via the processing system, one or more commands for adjusting one or more operations of the one or more industrial automation components based on the one or more statistical relationships; and sending, via the processing system, the one or more commands to the one or more industrial automation components.

16. The non-transitory computer-readable medium of claim 15, wherein the operations comprise:

receiving, via the GUI of the processing system, one or more inputs to adjust one or more values of one or more input variables of the set of input variables, wherein the one or more inputs comprise a sugar rate, a pH, a temperature, a pressure, a mixing speed, or any combination thereof;

generating, via the processing system, a predicted value for the target variable based on the one or more inputs; and displaying, via the GUI of the processing system, the predicted value.

17. The non-transitory computer-readable medium of claim 16, wherein the one or more inputs correspond to one or more slide visualizations associated with the one or more input variables.

18. The non-transitory computer-readable medium of claim 15, wherein the operations comprise storing the one or more statistical relationships in a central repository.

19. The non-transitory computer-readable medium of claim 15, wherein the operations comprise:

receiving, via the GUI of the processing system, one or more causal analysis inputs for generating a causal analysis graph, wherein the one or more causal analysis inputs are selected from the set of input variables;

receiving, via the GUI of the processing system, a treatment for generating the causal analysis graph, wherein the treatment comprises a front-door way (FW), back-door adjustment, inverse probability weighting (IPW), instrumental variables (IV), etc.), a target variable designation, a causal strength target, or any combination thereof; and generating, via the GUI of the processing system, a causal graph representative of one or more strengths of one or more input variables that correspond to the one or more causal analysis inputs with respect to the target variable.

20. The non-transitory computer-readable medium of claim 19, wherein the operations comprise:

receiving, via the GUI of the processing system, a refute method;

determining, via the processing system, one or more causal scores associated with the one or more strengths based on the dataset and the refute method, wherein the refute method comprises add random common cause, placebo treatment, dummy outcome, simulated outcome, add unobserved common causes, data subset validation, bootstrap validation, or any combination thereof; and displaying, via the GUI of the processing system, the one or more causal scores.

* * * * *